United States Patent
Xie et al.

(10) Patent No.: US 12,430,572 B2
(45) Date of Patent: Sep. 30, 2025

(54) DATA PACKET CLASSIFICATION METHOD AND SYSTEM BASED ON CONVOLUTIONAL NEURAL NETWORK

(71) Applicant: INSTITUTE OF COMPUTING TECHNOLOGY, CHINESE ACADEMY OF SCIENCES, Beijing (CN)

(72) Inventors: Gaogang Xie, Beijing (CN); Xinyi Zhang, Beijing (CN); Penghao Zhang, Beijing (CN)

(73) Assignee: INSTITUTE OF COMPUTING TECHNOLOGY, CHINESE ACADEMY OF SCIENCES, Beijing (CN)

( * ) Notice: Subject to any disclaimer, the term of this patent is extended or adjusted under 35 U.S.C. 154(b) by 868 days.

(21) Appl. No.: 17/761,220

(22) PCT Filed: Dec. 27, 2019

(86) PCT No.: PCT/CN2019/128935
§ 371 (c)(1),
(2) Date: Mar. 17, 2022

(87) PCT Pub. No.: WO2021/088234
PCT Pub. Date: May 14, 2021

(65) Prior Publication Data
US 2022/0374733 A1 Nov. 24, 2022

(30) Foreign Application Priority Data
Nov. 7, 2019 (CN) .......................... 201911081715.3

(51) Int. Cl.
G06N 5/025 (2023.01)
G06F 18/214 (2023.01)
G06N 3/02 (2006.01)

(52) U.S. Cl.
CPC .......... G06N 5/025 (2013.01); G06F 18/214 (2023.01); G06N 3/02 (2013.01)

(58) Field of Classification Search
USPC ....................................................... 382/159
See application file for complete search history.

(56) References Cited

U.S. PATENT DOCUMENTS

2019/0147283 A1* 5/2019 Giering ................. G06V 10/82
382/103

FOREIGN PATENT DOCUMENTS

| CN | 106534224 A | 3/2017 |
|---|---|---|
| CN | 106777644 A | 5/2017 |

(Continued)

OTHER PUBLICATIONS

International Search Report and Written Opinion Application No. PCT/CN2019/128935, dated Aug. 7, 2020, 12 pages.

(Continued)

Primary Examiner — Jacky X Zheng
(74) Attorney, Agent, or Firm — Zhong Law, LLC

(57) ABSTRACT

The disclosure provides a data packet classification method and system based on a convolutional neural network including merging each rule set in a training rule set to form a plurality of merging schemes, and determining an optimal merging scheme for each rule set in the training rule set on the basis of performance evaluation; converting a prefix combination distribution of each rule set in the training rule set and a target rule set into an image, and training a convolutional neural network model by taking the image and the corresponding optimal merging scheme as features; and classifying the target rule set on the basis of image similarity, and constructing a corresponding hash table for data packet classification.

14 Claims, 7 Drawing Sheets

(56) References Cited

FOREIGN PATENT DOCUMENTS

| | | | |
|---|---|---|---|
| CN | 109361617 A | | 2/2019 |
| CN | 109754021 A | * | 5/2019 |
| CN | 109886114 A | | 6/2019 |
| CN | 110297888 A | | 10/2019 |
| KR | 20180116934 A | | 10/2018 |
| WO | 2017200524 A1 | | 11/2017 |

OTHER PUBLICATIONS

Central South University, "Research on Fast Packet Classification Algorithm" MS Thesis, 2018, pp. 1-64.
Chinese Search Report received in Application No. 201911081715.3, dated Feb. 28, 2021, 2 pages.
Shen et al., "High-performance IPv6 Lookup with Real-time Updates using Hierarchical-balanced Search Tree," IEEE, 2018, pp. 1-7.

* cited by examiner (1) Prefix Combination Distribution Of An Original Rule Set
(2) Prefix Combination Distribution Of A Standardized Rule Set
(3) 2D Image Converted From Prefix Combination Distribution

DATA PACKET CLASSIFICATION METHOD AND SYSTEM BASED ON CONVOLUTIONAL NEURAL NETWORK

CROSS-REFERENCE TO RELATED APPLICATIONS

This application is the U.S. national stage of PCT/CN2019/128935 filed Dec. 27, 2019, which claims priority benefit to Chinese Patent Application No. 201911081715.3 filed Nov. 7, 2019. The contents of the above-mentioned applications are hereby incorporated by reference in their entireties.

TECHNICAL FIELD

The present disclosure relates to the technical field of data packet search and classification in a computer network, and more particularly, to a data packet classification method based on a convolutional neural network.

BACKGROUND

Data packet search and classification performs a fundamental function in switches, routers, firewalls, load balancers, cloud platform software switches, and other network devices. Data packet search and classification can be implemented by way of classification processing of data packets using a set of predefined or dynamically generated rules. Application scenarios such as software-defined networking, network function virtualization, and cloud computing require frequent updating of the rules. Storing the rules in a data structure such as a decision tree can achieve high-speed matching and forwarding of data packets. But the speed to update the rules can be slow. When the rules are being updated, matching and forwarding speed of the data packets will be greatly reduced. A hash-based data packet classification method can support quick update of the rules, but the matching and forwarding speed using the hash-based data packet classification method is slow. Thus, devices for software-defined networking, network function virtualization, cloud computing and so on have a strong need for a data packet classification method that not only can support high-speed data packet matching and forwarding, but also can meet quick online update of the rules.

Currently existing data packet classification technologies mainly fall into three categories: hardware-based data packet classification technology, data packet classification technology based on dimensionality reduction, and data packet classification technology based on space division.

In the hardware-based packet classification technology, Telecommunications Access Method (T-CAM) can reduce search time by implementing parallel search. However, the T-CAM has disadvantages such as limited storage space, high power consumption, and slow rule update speed. In addition to the T-CAM, data packet classification may also be run on other hardware platforms, such as a graphics processing unit (GPU) and a field-programmable gate array (FPGA). However, running on these platforms requires special-purpose chips, hardware instructions, and programming languages for design, resulting in inconvenient implementation and application.

In the data packet classification technology based on dimensionality reduction, Cross-producting and Recursive Flow Classification (RFC) first divide the multi-dimensional rules into a plurality of single-dimensional rules for individual matching, and finally merge all single-dimensional matching results. A disadvantage of this method is that when the rule set is large, the merging process becomes very complicated. In addition, when a rule is updated, a rule table corresponding to each dimensionality needs to be updated as well, thus slowing down the rule update speed.

In the data packet classification technology based on space division, the classification process is not to match an incoming data packet with the entire rule set. Instead, the classification process is divided into two steps: determining a subspace of the rule set to be searched in a first step, and matching the data packet with rules in the corresponding subspace in a second step. This method is further divided into two categories: a decision tree method and a hash-based method.

A key to decision tree methods (such as HiCuts and HyperCuts) is to recursively divide a search space into multiple subspaces until the number of rules in each region is below a certain threshold value. High efficiency of the decision tree ensures high-speed classification of data packets. But a tree-based data structure has a problem of slow update. In addition, some rules may need to be copied to the multiple subspaces, resulting in increased memory overhead. EffiCut and SmartSplit methods propose some rule space partitioning strategies to reduce rule duplication. But such methods still cannot support quick rule update.

The hash-based methods (such as Tuple Space Search) can achieve quick update of rules. But the hash-based methods have the disadvantage that search and matching speed of data packets is low. In the Tuple Space Search (TSS) method, when data packet classification is performed, all the hash tables need to be searched at one time to find out matching rules. Therefore, the classification speed may decrease as the number of hash tables increases. When the rules are updated, it is only needed to find the corresponding hash tables, and to insert or delete the rules. Therefore, the TSS can support quick updates. Although existing methods such as Pruned Tuple Space Search, TupleMerge, and PartitionSort sacrifice update performance to increase the search speed of the TSS, these methods still cannot simultaneously support efficient classification of the data packets and high-speed online update of the rules.

SUMMARY

Therefore, the existing data packet classification methods cannot support search speed, update speed and accuracy at the same time, and cannot achieve efficient data packet classification and high-speed online rule update.

To overcome the difficulties of the above-identified problems and deficiencies of the existing technologies, the present disclosure provides a data packet classification method characterized by a quick search speed, a quick rule update speed, and a high search accuracy. Furthermore, a data packet classification method based on a convolutional neural network is proposed. In the present disclosure, a method according to prefix combination distribution based on rule addresses is proposed to perform rule classification to form a variety of merging schemes, where rule merging schemes are determined by means of a performance module, a rule model is converted into an image model, and a rule set is quickly partitioned based on the convolutional neural network to construct a hash table. Meanwhile, efficient classification and search of the data packets and high-speed online update of the rules are implemented.

To achieve the above objectives, in an aspect, the present disclosure provides a data packet classification method based on a convolutional neural network. The method includes the following steps:

step S1: for each rule set in a training rule set, merging rules in the rule set according to combinations of different prefix ranges of source addresses and destination addresses of the rules in the rule set to form a plurality of merging schemes, and determining an optimal merging scheme for each rule set in the training rule set on a basis of performance evaluation; step S2: converting a prefix combination distribution of each rule set in the training rule set and a target rule set into an image, characterizing a parameter of the corresponding prefix combination distribution using a parameter of the image, and training a convolutional neural network model by means of taking the image in the training rule set and the corresponding optimal merging scheme as features; and step S3: inputting a target image converted from the target rule set into the convolutional neural network model, determining the merging scheme of the target rule set based on degree of matching between the target image and an image in the convolutional neural network model, and constructing a corresponding hash table for data packet classification.

In a preferred embodiment, a pixel coordinate of the converted image represents a prefix length or length range combination of the source addresses and the destination addresses of the rules in the corresponding rule set, and a pixel value represents the number of the rules in the corresponding rule set corresponding to the prefix length or length range combination.

In another preferred embodiment, in the step S2, the training a convolutional neural network model includes: classifying the prefix combination distribution of the rule set based on similarity between the images, and determining a corresponding merging scheme for the prefix combination distribution of each category.

In yet another preferred embodiment, the method includes: calculating differential information between pixels of the image corresponding to each prefix combination distribution as a fingerprint of the corresponding image, calculating a differential value between the fingerprint of each image and a fingerprint of a reference image, and determining a category of the rule set corresponding to the corresponding image based on comparison between the differential value and a predetermined threshold.

In still another preferred embodiment, the method further includes performing rule update on the target rule set. The performing rule update includes: determining a corresponding hash table based on a prefix combination length of a to-be-updated rule, updating the to-be-updated rule in a corresponding hash bucket, and updating a value of the pixel corresponding to the to-be-updated rule in the image of the prefix combination distribution corresponding to the target rule set.

In still another preferred embodiment, the method further includes: monitoring a Hamming distance before and after the prefix combination distribution of the target rule set is updated, and determining whether to reconstruct the hash table based on the Hamming distance.

In still another preferred embodiment, the method further includes: setting a priority for each hash table, where the priority represents a highest priority of a rule in the hash table; and sorting all the hash tables, and when performing data packet matching, stopping searching when a priority of a hit rule is no less than a priority of a next hash table.

In still another preferred embodiment, the performance evaluation is carried out by using a formula $$T = \bar{h}\Sigma_{i=1}^{m} + \bar{c}\Sigma_{i=1}^{m}\frac{n_i}{s_i} + \bar{q},$$

where $\bar{h}$ represents an average hash time, $\bar{c}$ represents an average verification time, m represents the number of hash tables, $n_i$ represents the number of rules in an $i^{th}$ hash table, $s_i$ represents a size of the $i^{th}$ hash table, and $\bar{q}$ represents a priority comparison time.

In another aspect, the present disclosure provides a data packet classification system based on a convolutional neural network, which includes an offline system and an online system.

The offline system includes a calculation module and a convolutional neural network offline training module, and the online system includes a data packet classification and forwarding module and a convolutional neural network online module.

The calculation module is configured to merge rules in each rule set of a training rule set according to combinations of different prefix ranges of source addresses and destination addresses of the rules, determine an optimal merging scheme for each rule set on a basis of performance evaluation of different merging schemes, and convert each prefix combination distribution of each rule set in the training rule set into an image, to characterize a parameter of the corresponding prefix combination distribution using a parameter of the image. The convolutional neural network offline training module is configured to train a convolutional neural network model using the training rule set by means of taking the image in the training rule set and the corresponding optimal merging scheme as features.

The convolutional neural network online module is configured to convert the prefix combination distribution of a target rule set into an image, characterize a parameter of the corresponding prefix combination distribution using the parameter of the image, and determine the merging scheme of the target rule set using the trained convolutional neural network model.

The data packet classification and forwarding module is configured to construct a corresponding hash table based on the merging scheme, to perform data packet classification based on the hash table.

In still another preferred embodiment, the convolutional neural network offline training module is configured to classify the prefix combination distribution of the rule set based on similarity between the images, and determine a corresponding merging scheme for the prefix combination distribution of each category.

In still another preferred embodiment, the system further includes a monitoring module. The monitoring module is configured to read the prefix combination distribution of the target rule set and determine a category of the target rule set, and determine, based on variation of the category, whether to reconstruct the hash table.

In still another preferred embodiment, when the rule is updated, the data packet classification and forwarding module determines a corresponding hash table based on the prefix combination of the to-be-updated rule, and update the to-be-updated rule in the corresponding hash bucket. The convolutional neural network online module updates a value of the pixel corresponding to the to-be-updated rule in the image of the prefix combination distribution corresponding to the target rule set.

In still another aspect, the present disclosure provides a computer-readable storage medium having a computer program stored thereon, which when executed by a processor, causes the processor to perform the above operations.

A computer device includes a memory and a processor, where the memory has stored thereon a computer program executable by the processor, which when executed by the processor, causes the processor to perform the above operations.

Technical Effects

The method of the present disclosure can significantly improve data packet search performance, increase data packet search speed, and increase rule update speed.

By mutual collaboration between the online system and the offline system, the system of the present disclosure can ensure that the online system implements efficient search of data packets and quick update of rule sets. Preferably, by monitoring the update of the rule sets, the system can consistently reflect the most current state of a network.

As verified in a preferred embodiment, a data packet search performance of the method of the present disclosure (CRP) is plainly 4.1 times that of a PartitionSort (PS) method, 8.3 times that of a Tuple Space Search (TSS) method, 3.5 times that of a Pruned Tuple Space Search (PR_TSS) method, and 4.3 times that of a TupleMerge (TM) method.

The update speed of the method of the present disclosure is 9.6 times that of the PS method, 1.8 times that of the TSS method, 2.3 times that of the PR-TSS method, and 5.2 times that of the TM method.

The method of the present disclosure may further reduce rule storage overhead by merging hash tables. Compared with other algorithms, memory overhead of the present disclosure is 36% of the PS method, 70% of the TSS method, and 63% of the PR-TSS method.

BRIEF DESCRIPTION OF DRAWINGS

The following accompanying drawings are merely used to make exemplary illustration and explanation of the present disclosure, and are not intended to limit the scope of the present disclosure, in which.

DETAILED DESCRIPTION

To make clearer the objectives, technical schemes, design methods and advantages of the present disclosure, the present disclosure is further described in detail below with reference to the accompanying drawings and specific embodiments. It is to be understood that the embodiments set forth herein are only used to illustrate the present disclosure, and are not intended to limit the present disclosure.

A data packet classification technology is one of the most critical operations in network devices, and its data packet classification speed and rule update speed play a vital role in the overall performance of a system. However, the existing technology cannot support quick data packet classification and efficient online update of rules at the same time. To solve this problem, the present disclosure proposes a data packet classification system and classification method based on a convolutional neural network (CNN) to support quick online update and efficient search of data packets.

Figure 1:
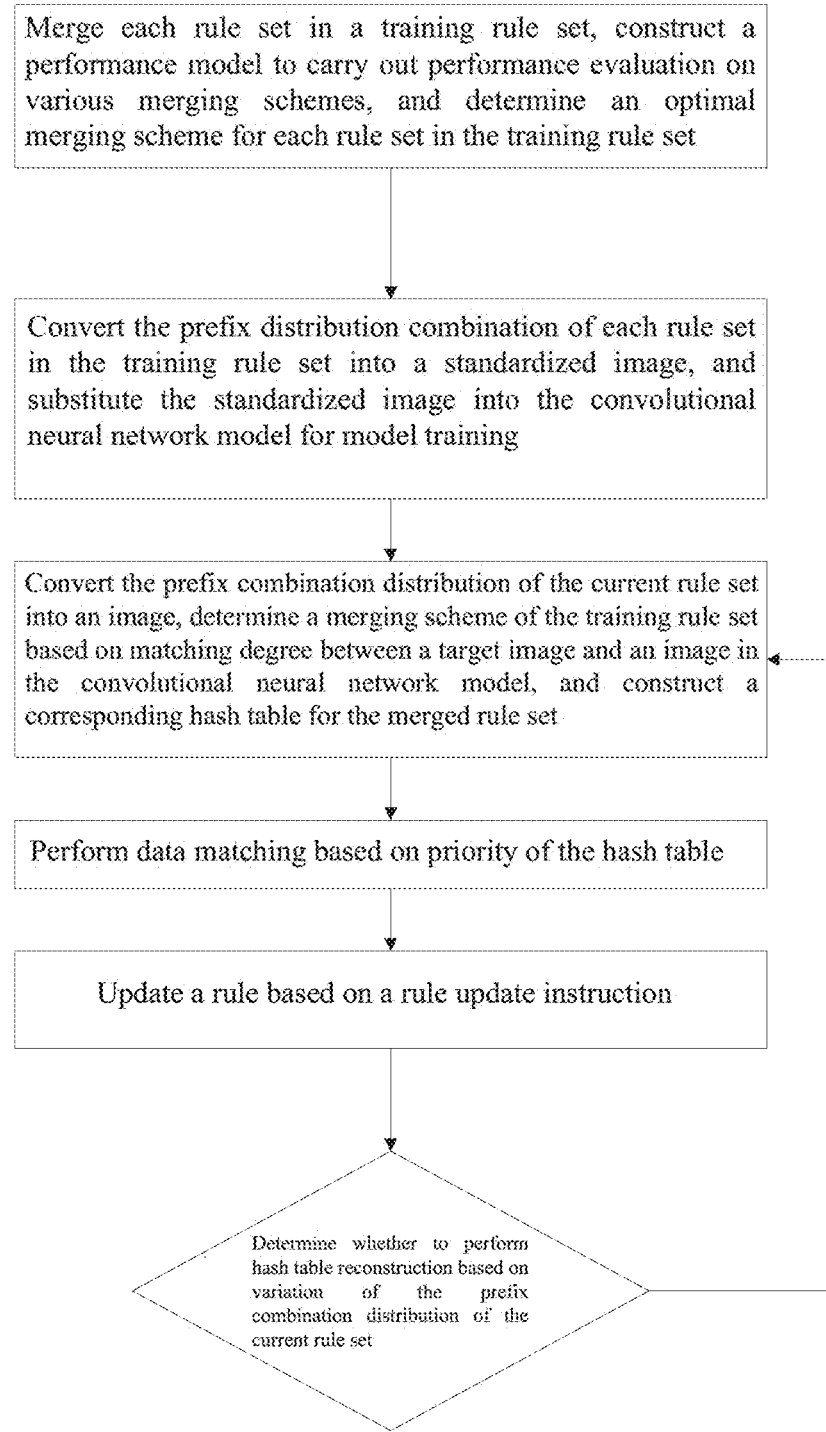
FIG. 1 is a schematic flowchart of a data packet classification method based on a convolutional neural network according to an embodiment of the present disclosure.

Specific processes of construction of hash tables and classification of data packets in the present disclosure will be described in detail below with reference to FIG. 1.

At step S1, each rule set in a training rule set is merged, a performance model is constructed to carry out performance evaluation on various merging schemes, and an optimal merging scheme is determined for each rule set in the training rule set based on performance evaluation.

At step S1.1, hash merging of data packet classification is first performed to form different merging schemes.

Based on in-depth study on data classification, it is learned that speed of data packet classification can be improved by reducing the number of hash tables corresponding to the rule set. However, at the same time, it is required to avoid matching overhead caused by the rules falling into the same bucket of the hash tables. Therefore, the hash merging method proposed by the present disclosure ensures a lower rule conflict rate while reducing the number of hash tables, thus improving the search speed of data packets.

According to the present disclosure, based on prefix combination distribution of rules, by means of classification using "prefix range combination", i.e., by means of classification based on combination of a prefix range of source addresses and a prefix range of destination addresses of a rule set, the rule set is divided into a plurality of disjoint subsets to reduce the number of hash tables.

For example, the rule set in Table 1 may be merged into four hash tables as shown in Table 2, and the prefix range combinations of the four hash tables are ([0, 3), [0, 4)), ([0, 3), [4 , 6)), ([3, 6), [0, 4)), and ([3, 6), [4, 6)) respectively, as shown in Table 2. A rule 0 in Table 1 is mapped to ([3, 6), [4, 6)) in Table 2, indicating that prefixes of its source address and destination address fall within the range of [3, 6) and [4, 6]), respectively.

TABLE 1

Original Rule Set

| Rule Number | Source Address | Destination Address | Priority | Action |
|---|---|---|---|---|
| 0 | 100* | 11010 | 2 | Fwd 0 |
| 1 | 101* | 1001* | 2 | Fwd 1 |
| 2 | 11111 | 10000 | 3 | Drop |
| 3 | 111* | 1000* | 2 | Fwd4 |
| 4 | 0100* | 0110* | 2 | Fwd0 |
| 5 | 001* | 01001 | 3 | Fwd2 |
| 6 | 00* | 01001 | 2 | Drop |
| 7 | 01110 | * | 4 | Drop |
| 8 | 110* | 1* | 1 | Fwd1 |
| 9 | * | * | 0 | Fwd3 |

TABLE 2

Rule Set Merged

| Hash Table Number Merged | Prefix Range Combination | Corresponding Rule Number |
|---|---|---|
| 0 | ([3, 6), [4, 6)) | 0, 1, 2, 3, 4, 5 |
| 1 | ([3, 6), [0, 4)) | 7, 8 |
| 2 | ([0, 3), [4, 6)) | 6 |
| 3 | ([0. 3), [0, 4)) | 9 |

At step S1.2, performance evaluation in the process of data packet classification is carried out by means of a performance model.

According to an embodiment of the present disclosure, a performance model is proposed to estimate performance of data packet classification by analyzing time overhead required for each step in a hash-based data packet classification method.

The hash-based data packet classification method generally includes three steps as below: 1) searching all hash tables in a target system to determine whether there are rules matching data packets in the hash tables; 2) verifying whether the rules actually match data (domains corresponding to packet headers) in the data packets to avoid false positives caused by hash collisions or rule overlaps; and 3) when a plurality of rules are matched, selecting a rule with the highest priority as a final classification result of the data packets. Therefore, hash-based packet classification time includes the above three components. Hash time is related to the number of hash tables. Time for matching verification depends on the number of hash collisions or the number of rule overlaps. Given a hash function, a probability of matching entries in a hash table is in proportion to a utilization rate of each hash table, where this proportion may be defined as the number of entries in this hash table divided by a size of a solution space of this hash table:

$$r_i = \frac{e_i}{s_i} \quad (1)$$

where $r_i$ represents a hit rate of an $i^{th}$ hash table, $e_i$ represents the number of entries in the $i^{th}$ hash table, and $s_i$ represents a size of the $i^{th}$ hash table. When a certain rule in the hash table is a hit, it needs to further verify to avoid false positives caused by the hash collisions or rule overlaps. After a matched entry is found in the hash table, the verification time is a time spent in weighting an average overlap rate, where the average overlap rate is defined as the number of rules in the hash table divided by the number of entries:

$$o_i = \frac{n_i}{e_i} \quad (2)$$

where $o_i$ represents the average overlap rate of the $i^{th}$ hash table, and $n_i$ represents the number of rules in the $i^{th}$ hash table. Therefore, time T required to classify one data packet is as below:

$$T = \sum_{i=1}^{m} h_i + \sum_{i=1}^{m} c_i r_i o_i + \overline{q} \quad (3)$$

where m represents the number of hash tables, $h_i$ represents hash calculation time of the $i^{th}$ hash table, $c_i$ represents verification time after hitting the $i^{th}$ hash table, and $\overline{q}$ represents time for rule priority comparison. By substituting Formulas (1) and (2) into Formula (3), it may be transformed into Formula as below:

$$T = \sum_{i=1}^{m} h_i + \sum_{i=1}^{m} c_i \cdot \frac{e_i}{s_i} \cdot \frac{n_i}{e_i} + \overline{q} \quad (4)$$

and this Formula may be further simplified as below:

$$T = \overline{h} \sum_{i=1}^{m} + \overline{c} \sum_{i=1}^{m} \frac{n_i}{s_i} + \overline{q} \quad (5)$$

where $\overline{h}$ represents an average hash time, and $\overline{c}$ represents an average verification time.

By means of this performance model, one can learn factors that affect performance of data packet classification and how to improve a matching speed of hash-based data packet classification. This performance model guarantees rationality and efficiency of a merging scheme for each category of rule set in the method of the present disclosure.

At step S1.3, a hash table merging scheme is determined based on average search performance of different hash table merging schemes by means of the performance model, and a hash table is constructed.

By reducing a prefix length and merging the hash table, a large number of rules may fall into the same bucket of the hash table to cause hash collisions, and the verification of hash collisions may further cause matching overhead. Therefore, by means of the performance model, one can determine the optimal hash table merging scheme by comparing the average search performance of different hash table merging schemes, thereby minimizing a collision probability.

In this way, the optimal merging scheme is determined for each rule set in the training rule set, and labels are added to the corresponding rule sets to form the training rule set with the labels added.

At step S2, the prefix distribution combination of each rule set in the training rule set is converted into a standardized image (subsequently, a target rule set will be picturized in a similar manner), and the standardized image is substituted into the convolutional neural network model for model training. During model training, a training set is divided into two parts: a feature and a label. In the method of the present disclosure, the feature is the prefix combination distribution corresponding to the rule set, i.e., an image converted from the distribution, and the label is the corresponding optimal merging scheme.

At step S2.1, the prefix distribution combination of each rule set in the training rule set is converted into a standardized image.

In the hash merging method, all merging cases need to be traversed, and the hash table is constructed according to a scheme with the optimal search performance. One distinctive point of the data packet classification method based on a convolutional neural network proposed in the present disclosure is in transforming the process of finding an optimal solution by traversing all the merging schemes into an image recognition issue. Therefore, it needs to first establish a model to convert a prefix combination distribution of different rule sets into an image.

Figure 3:
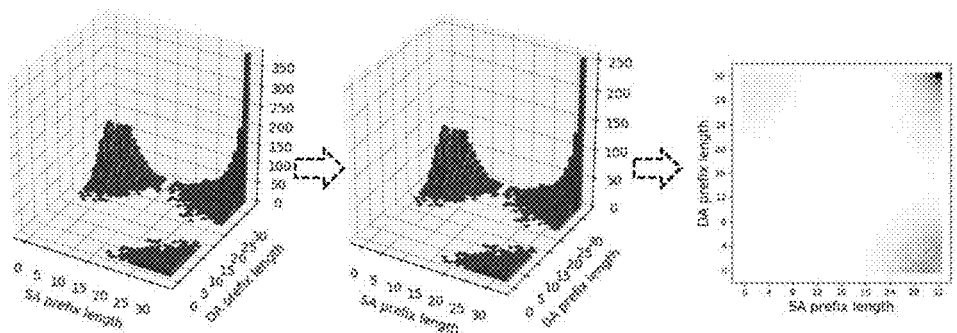
FIG. 3 is a schematic diagram showing standardization and transformation of rule sets according to the method of the present disclosure.

In different five-tuple rule sets, combinations of lengths of source IP address prefixes and lengths of destination IP address prefixes are commonly not identical. To obtain the feature of the rule set, in the present disclosure, the prefix combination distribution of the IP addresses of each rule set is converted into a two-dimensional image, the lengths of the source IP address prefixes are represented using one dimensionality (such as x-coordinate), and the lengths of the destination IP address prefixes are represented using another dimensionality (such as y-coordinate). When the prefix combination distribution of a rule needs to be represented by a fine-grained image, that is, each pixel represents a "prefix length combination", each pixel value in the two-dimensional image is set to the number of corresponding "prefix length combination" rules in the rule set. When the image needs to be coarse-grained, ranges may be partitioned for the rule prefixes according to a certain step size in each dimensionality, and each pixel represents a "prefix range combination", and each pixel value of the two-dimensional image is set to the number of corresponding "prefix range combination" rules in the rule set. Regardless of whether it is a fine-grained or coarse-grained image, the range of the pixel value of the image depends on the number of bits used by the pixel. For example, when the number of bits used by the pixel is n, the range of the pixel value of the image is [0, $2^n-1$]. In the rule set, whether it is a prefix length combination or a prefix range combination, the number of rules for each combination has no range limitation. Therefore, the number of rules for each prefix combination in the rule set needs to be standardized according to the range of the pixel values of the image, to ensure that the number of rules falls within the same range as the pixel value. This process is as shown in FIG. 3 where a rule prefix length is any value within an IPV4 address prefix range. Naturally, during a use process, those skilled in the art may consider using other image parameters to characterize parameters of the rule set during image conversion.

During training of the convolutional neural network model (for the subsequent offline system) and rule set update monitoring (corresponding to the subsequent online system) during application of the convolutional neural network model, the rule sets need to be classified based on image recognition. The following two steps S2.2 and S2.3 are image processing procedures, which may be used for offline training, online classification, and online rule set update monitoring.

Specifically, in the process of training of the convolutional neural network model (corresponding to the subsequent offline system), it is required to determine how many categories of images there are in the training set in the following steps S2.2 and S2.3, to ensure that the images of the same category are similar.

During application, when the data packets are classified (corresponding to the subsequent online system), it is necessary to convert the rule set into an image, and then the image is inputted into the neural network for recognition to find the corresponding merging scheme. Neither Step S2.2 nor Step S2.3 is required in this process. That is, the neural network can directly determine the category, while the Steps S2.2 and S2.3 are used for comparison of two images. During rule monitoring, it is required to determine whether to reconstruct a hash table, so as to determine variation of the image. In this case, Steps S2.2 and S2.3 need to be performed.

At step S2.2, characterization information of the image is extracted.

A corresponding hash table construction scheme may be provided for each rule set. However, in practice, the number of categories of rule sets is huge, and this scheme is not feasible. Since performance of the hash table construction scheme mainly depends on distribution of the rule set, embodiments classify the prefix combination distribution of the rule set, and the same scheme is adopted for the same category. Based on the above reason, the present disclosure adopts the following steps to obtain a fingerprint of each image to measure image distribution similarity: 1) The image of the prefix combination distribution of the rule set is scaled down by means of nearest neighbor interpolation (depending on accuracy selected by users. The larger the scale is, the fewer image pixels are obtained, and the less information the scaled-down image contains. The smaller the scale is, the more the image pixels are obtained, and the more information the scaled-down image contains. 2) Two adjacent pixels are compared, and each row of pixels is converted into a differential value. 3) The differential value is encoded in turn, if in the same row a pixel value P [x] of an $x^{th}$ column is smaller than a pixel value P [x+1] of an $(x+1)^{th}$ column, that is, if P [x]<P [x+1], the differential value is set to "1", otherwise the differential value is set to "0", and a character string obtained is used as the fingerprint of the image (or referred to as the characterization information of the image).

At step S2.3, the image is classified based on the characterization information of the image.

Preferably, in the present disclosure, a Hamming distance, that is, the number of different characters in corresponding positions of two equal-length character strings is used to calculate the number of different digits between two fingerprints, thereby measuring the similarity between different distributions. When the Hamming distance is smaller than a threshold value K, the two images are considered to be in the same category. Otherwise, the two images are considered to be in different categories. Selection of the threshold value K depends on variations of the rules and demands of the users in the actual scenario. A smaller threshold value K indicates a more accurate measurement of image similarity, a higher sensitivity of the system to image variations and a more complex system. Conversely, a larger threshold value K indicates a more rough measurement of the image similarity, a lower sensitivity of the system to image variations and a less complex system.

Figure 10:
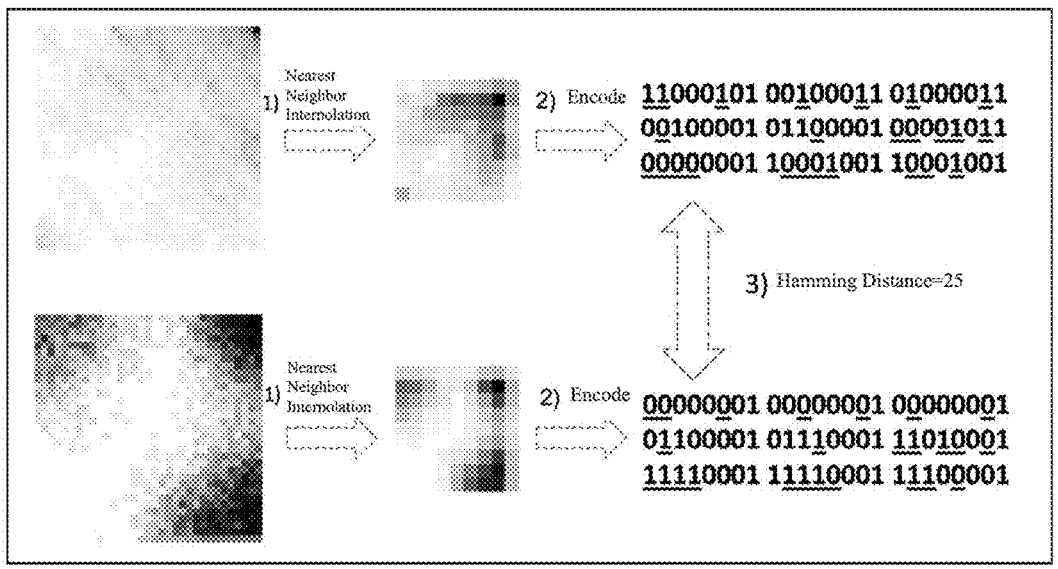
FIG. 10 is a schematic diagram of image fingerprint acquisition and similarity comparison using the method of the present disclosure.
Figure 12:
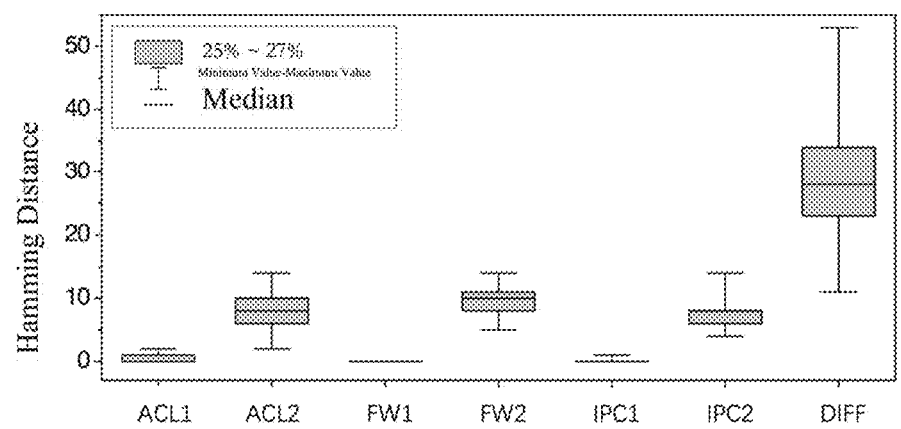
FIG. 12 is a boxplot graph of calculating a Hamming distance between rule sets.

As shown in FIG. 10, the fingerprints of the two images are obtained, and the Hamming distance between the two images is 25. If the value of the threshold value K is defined as 20, since 25 is greater than 20, the two images belong to different categories. If the value of the threshold K is defined as 30, since 25 is smaller than 30, the two images belong to the same category. The selection of the threshold value K may be illustrated by the following example. Supposing there are six categories of rules in an actual scenario, namely ACL1, ACL2, FW1, FW2, IPC1, and IPC2, and each category of rule includes 200 different rule sets. In each category of rules, the Hamming distance between the images corresponding to every two rule sets is calculated to obtain six box plots from left to right in FIG. 12. For each rule set, the Hamming distance between every two rule sets in different categories of rules is calculated to obtain a last box plot in FIG. 12. As seen from FIG. 12, it can be found that in the six box plots from left to right, the maximum value of the Hamming distance is smaller than 15, while in the last box plot, the minimum value of the Hamming distance is greater than 10. To ensure that the Hamming distance between the same category of rule set is as small as possible, and the Hamming distance between different categories of rule sets should be as large as possible, and 15 may be selected as the threshold K to distinguish different categories of rule sets.

At step S3, the prefix combination distribution of the current rule set is picturized, the current rule set is substituted into the trained convolutional neural network model to determine the category of the current rule set based on image similarity, and a hash table merging scheme is determined according to the category of the current rule set to construct a hash table. During application, a rule set to be processed needs to be converted into an image. The method is the same as that in the training set, that is, in one system, selection of granularity is defined. Once the granularity is determined, one rule set only corresponds to one image.

After a rule set is converted into an image using the method of the present disclosure, the category of the rule set can be quickly recognized through a CNN network. Different from a label of an image in the traditional image classification, in the present disclosure, an optimal hash table merging scheme under a current distribution is selected as the label. Therefore, when the rule set is converted into the corresponding image and is inputted into the CNN network, the corresponding hash table merging scheme can be quickly obtained, and a hash table can be quickly constructed.

At step S4, data matching is performed based on priority of the hash table.

After the hash table is constructed, when data packet matching is required, the matching may be performed ordinarily, or may be performed by using the following method of the present disclosure.

Specifically, by merging the hash tables, the search speed of the hash tables can be improved, but it is still required to search all the current hash tables in turn. To accelerate the data packet matching and the search speed, the present disclosure provides two optimization schemes. First, a priority is set for each hash table, where the priority of the hash table is the highest priority of the rules contained in the hash table, and then the hash tables are sorted in a descending order of priority. By sorting the hash tables, the search is stopped once the priority of the hit rule is no less than that of a next hash table, thereby accelerating the search speed. In a second optimization scheme, rules in the same bucket of the hash table are sorted in a descending order of priority. Once a certain rule is matched, this rule is one with the highest priority in the bucket. In this case, comparison of the rules in the bucket is ended, thereby accelerating the search speed.

At step S5, a rule to be updated is updated using the following method.

After the hash table merging scheme is determined, update of a rule includes insertion and deletion of the rule. In the present disclosure, when a new rule needs to be inserted, it first needs to find a corresponding hash table (each hash value in the hash table corresponds to one hash bucket which contains rules corresponding to the hash value) according to a rule prefix combination length of the new rule. After the new rule is inserted into the corresponding hash bucket in the hash table, the rules in the bucket are re-sorted in a descending order of priority. At the same time, a prefix combination distribution image corresponding to the rule set needs to be updated to increase the value of the pixel corresponding to this rule. When a rule needs to be deleted, it first needs to locate the corresponding hash table, and then the rule is deleted. At the same time, a prefix combination distribution image corresponding to this rule set is updated to reduce the value of the pixel corresponding to this rule. After a rule is deleted, if a hash table corresponding to the rule is also empty, the hash table is also deleted.

When a hash table is updated so that a category of the prefix combination distribution corresponding to the current hash table is different from a category of the prefix combination distribution corresponding to a previous update, that is, when the category changes, hash table reconstruction is performed.

At step S6, whether to perform hash table reconstruction is determined based on variation of the prefix combination distribution of the current rule set.

Specifically, it is first measured a Hamming distance between a current rule prefix combination distribution $D_C$ and a corresponding prefix combination distribution $D_P$ during a previous hash table construction. If the Hamming distance is greater than the threshold K, it indicates that the distribution $D_C$ and the distribution $D_P$ do not belong to the same distribution pattern. Therefore, the distribution $D_C$ is sent to the CNN model to find a corresponding label, i.e., a new hash table merging scheme. In addition to the new label, the CNN model will also output a rule set prefix combination distribution R corresponding to this label. If the Hamming distance between $D_C$ and R is still greater than the threshold, the $D_C$ is considered as a new distribution pattern and is transferred to the offline system. Furthermore, by comparing performance of a current merging scheme and performance of Tuple Space Search (TSS) by means of a performance model, a scheme with better performance is selected as the merging scheme. Otherwise, it has become another known distribution, and it merely needs to reconstruct the hash table according to the label.

Figure 2:
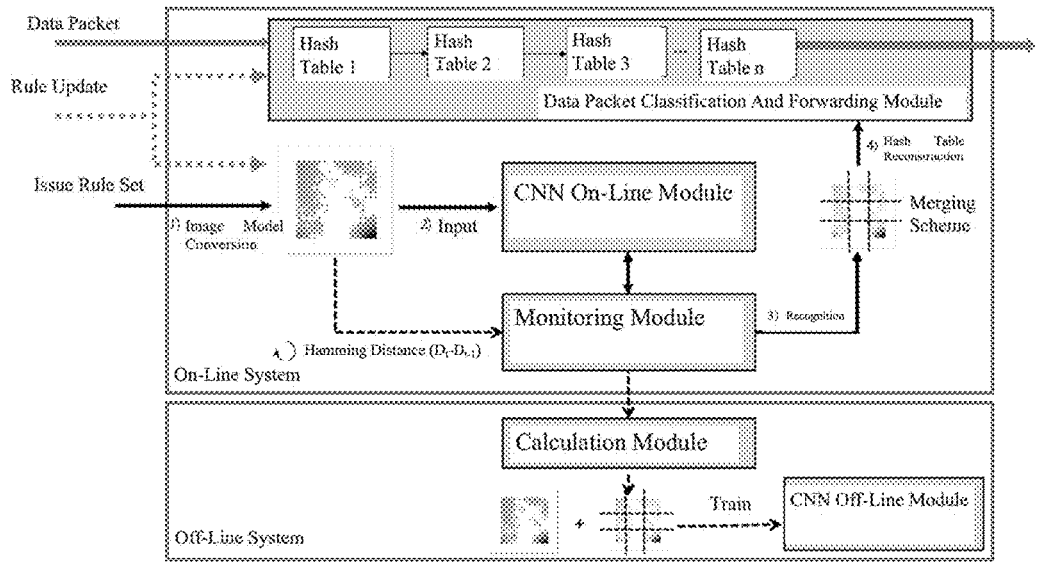
FIG. 2 is a schematic structural diagram of a data packet classification system based on a convolutional neural network according to an embodiment of the present disclosure.

The method of the present disclosure may be implemented by a classification system as shown in FIG. 2 or by other systems.

In summary, the classification system of the present disclosure adopts an online update efficient data packet search classification architecture. As shown in FIG. 2, the classification system includes an online system and an offline system.

The offline system includes a calculation module and a CNN offline module. In the offline system, each rule set in the training set and/or test set (collectively referred to as a training rule set) is merged in different ways. The calculation module is configured to evaluate performances of different merging schemes using the performance model to obtain an optimal hash table merging scheme corresponding to each rule set in the training set and/or test set. The CNN offline module is configured to train the CNN model by using each hash table merging scheme and distribution characteristics of the rules in the corresponding rule set as the training set, and send the trained model to the CNN online module.

Preferably, the merging scheme is formed as follows: based on prefix combination distributions of source addresses and destination addresses of rules, the rules having predetermined prefix values or prefix ranges in the rule set of a target system are combined, and the rule set is divided into a plurality of disjoint subsets, where each combination mode forms a merging scheme, and the optimal hash table merging scheme is determined using the performance model based on an average search performance of different hash table merging schemes.

The online system includes three modules: a CNN online module, a data packet classification and forwarding module, and a monitoring module.

The CNN online module is configured to recognize a rule distribution in the rule set to be classified and determine its hash table merging scheme by means of the trained CNN model. Specifically, the prefix combination distribution of the source addresses and the destination addresses of the rules in the current rule set is converted into a corresponding image, the category of the current rule set is determined based on image recognition to determine the hash table merging scheme.

The data packet classification and forwarding module is configured to match and forward data packets. When updating the rules, the classification system of the present disclosure needs to update the corresponding hash table and the rule set prefix combination distribution in the data packet classification and forwarding module. The monitoring module is configured to monitor variation of the rule set prefix combination distribution and reconstruct the hash table when the category of the prefix combination distribution is changed due to the variation. By means of mutual collaboration between the online system and the offline system, the classification system of the present disclosure can ensure that the online system implements efficient search of data packets and quick update of rule sets. In the meanwhile, by monitoring the update of the rule sets, the classification system can consistently reflect a most current state of a network.

Working processes of the classification system in the present disclosure are briefly described below.

In an initialization phase, the CNN offline module in the offline system trains the CNN model by using an image mapped from the rule set prefix combination distribution and the optimal hash table merging scheme obtained by the calculation module for the current distribution as labels. After the model is trained, the model is sent to the online system as a model in the CNN online module. Next, the online system and the offline system work collaboratively in the following way.

After the classification system receives an issued rule set to be processed, the online system first converts the prefix combination distribution of an original rule set into an image by means of an image model, and transfers the image to the CNN online module to obtain the hash table merging scheme. Based on this merging scheme, the data packet classification and forwarding module constructs a hash table.

After the data packet classification and forwarding module constructs the hash table, for a data packet received by the system, rule search and matching are directly performed in the module. After a corresponding rule is matched, a corresponding action is performed on the data packet according to this rule.

When the rule set is updated, the corresponding hash table and the rule set prefix combination distribution in the data packet classification and forwarding module are updated synchronously. The monitoring module reads the rule set prefix combination distribution at a certain time interval. When it is found that the rule distribution has changed to another category, the hash table merging scheme is updated, and the hash table is reconstructed. When this distribution is in a new category, the monitoring module also transfers this new category of distribution to the offline calculation module to obtain a corresponding label. A new rule prefix combination distribution image and a corresponding label thereof may be transferred to the CNN offline module in the offline system for model training. Finally, the old online CNN model is replaced with the newly trained CNN model.

By means of mutual collaboration between the online system and the offline system, the architecture provided in the present disclosure can ensure that the online system implements efficient search of data packets and quick update of rule sets. In the meanwhile, by monitoring the update of the rule sets, the latest state of the network is always reflected. In this way, high-speed matching and forwarding of the data packet and quick online update of the rules are implemented.

Classification Test Examples

To verify the performance of the method of the present disclosure, the applicants adopts a test data set comprising six rule sets (ac11, ac12, fw1, fw2, ipc1, and ipc2) generated by ClassBench and two real rule sets (cloud1, cloud2) to test the data packet classification method of the present disclosure and various classification methods in the existing technology. Upon testing, the method of the present disclosure can significantly improve the data packet search performance, increase the data packet search speed, and increase the rule update speed.

Figure 4:
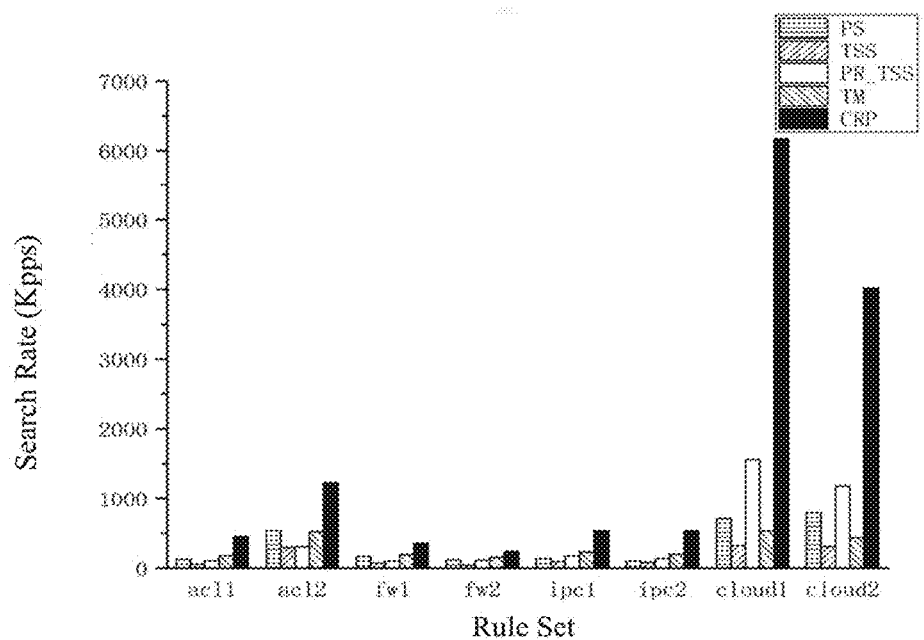
FIG. 4 is a schematic diagram showing search performance comparison between the method of the present disclosure and an existing method when the rule set is not updated in an actual test.

The data packet search performance of the method (CRP) of the present disclosure is clearly superior to other algorithms. As shown in FIG. 4, the CRP method of the present disclosure is 4.1 times that of Partition Sort (PS), 8.3 times that of Tuple Space Search (TSS), 3.5 times that of Pruned Tuple Space Search (PR_TSS), and 4.3 times that of Tuple Merge (TM).

Figure 5:
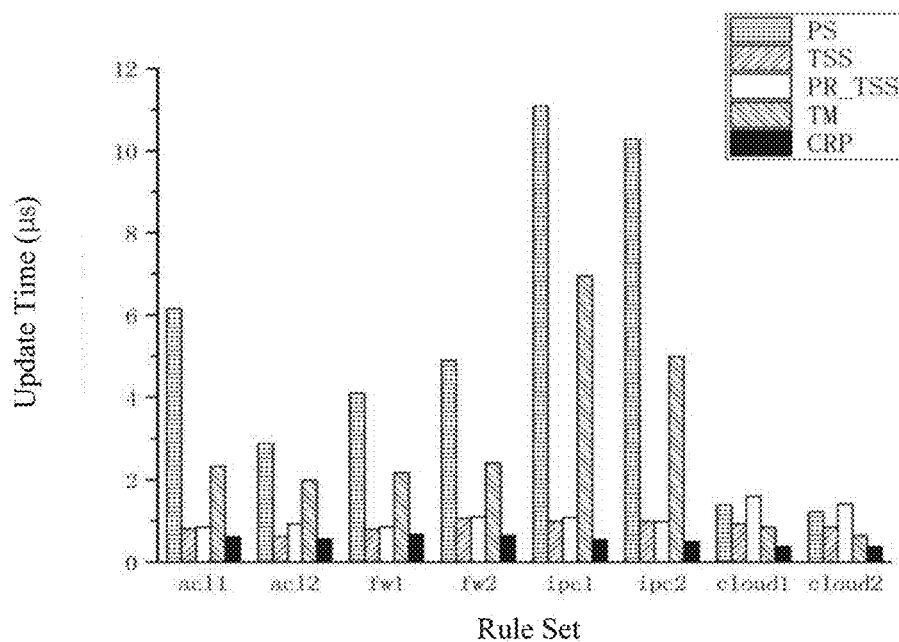
FIG. 5 is a schematic diagram showing rule update time comparison between the method of the present disclosure and the existing method in the actual test.

Comparison of the update speed is as shown in FIG. 5, the rule update speed of the present disclosure is 9.6 times that of PS, 1.8 times that of TSS, 2.3 times that of PR-TSS, and 5.2 times that of TM.

Figure 6:
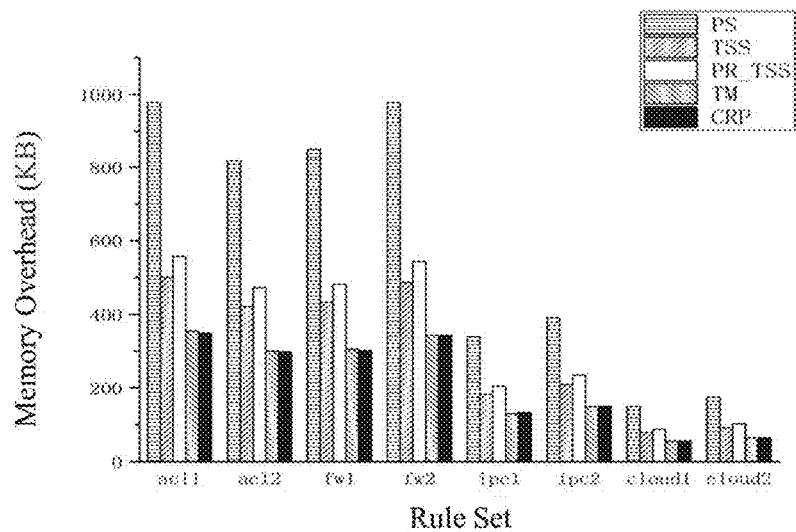
FIG. 6 is a schematic diagram showing comparison of memory overheads of the rule set between the method of the present disclosure and the existing method in the actual test.

The present disclosure further reduces rule storage overhead by merging the hash tables, and comparisons with other algorithms are as shown in FIG. 6. The memory overhead of the present disclosure is 36% of PS, 70% of TSS, and 63% of PR-TSS.

Figure 7:
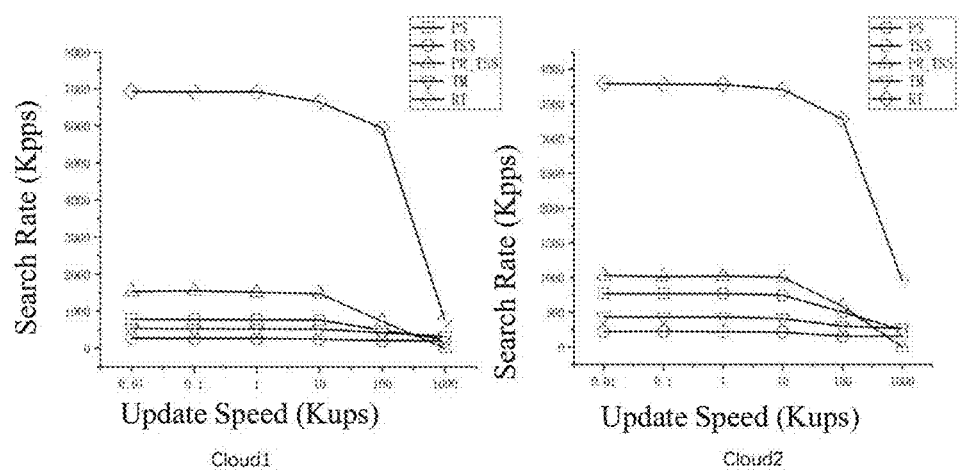
FIG. 7 is a schematic diagram showing comparison of data packet search rates between the method of the present disclosure and the existing method at different rule set update rates in the actual test.

In addition, in the case of rule update, as the update speed increases, the search rate of each method decreases. However, the performance of the data packet classification method based on the convolutional neural network proposed by the present disclosure is consistently greater than performances of other methods, as shown in FIG. 7.

Figure 8:
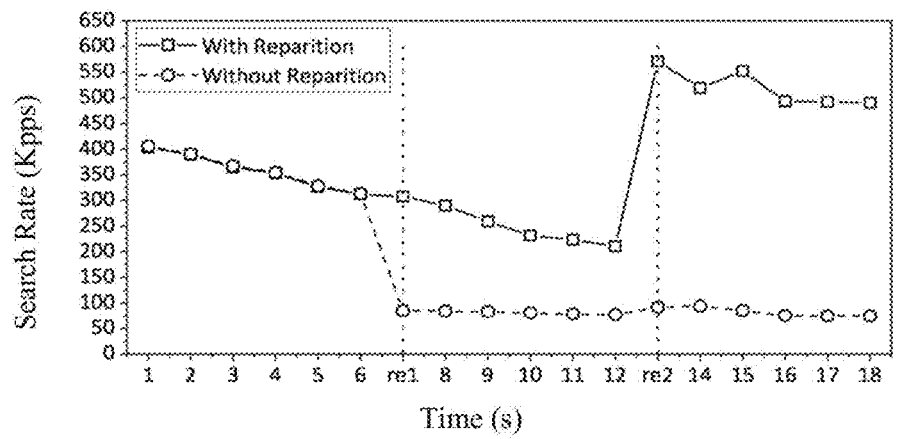
FIG. 8 is a schematic diagram showing comparison between system performance with a monitoring module and system performance without the monitoring module in the actual test.

Meanwhile, when the rule set update causes a change in the prefix distribution, according to the present disclosure, by reconstructing the hash table, it is ensured that the system consistently maintains a higher data packet search rate, and the performance of the system is as shown in FIG. 8.

Figure 9:
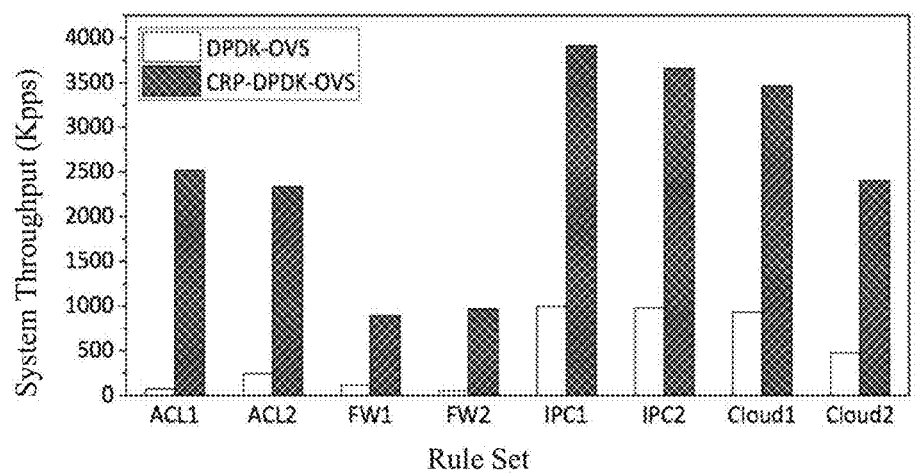
FIG. 9 is a schematic diagram showing performance comparison between a native Open vSwitch (OVS) and the OVS incorporating the method of the present disclosure.

Further, by substituting the method of the present disclosure into Open vSwitch to replace the structure of MegaflowCache (which adopts the Tuple Space Search method), it is found that throughput of the replaced Open vSwitch is 10 times that of the native Open vSwitch, as shown in FIG. 9.

Figure 11:
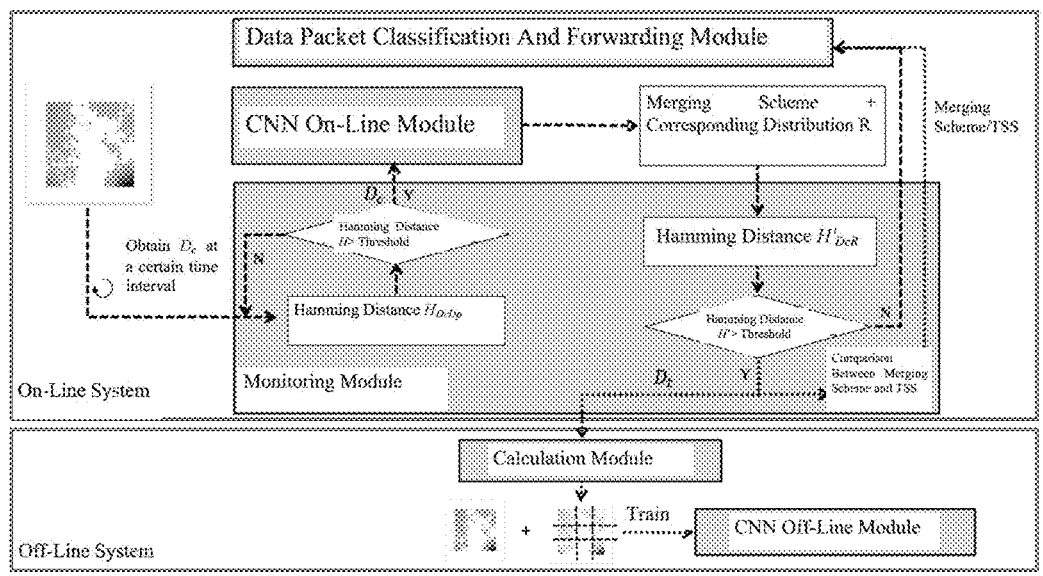
FIG. 11 is a schematic flow diagram of determining reconstruction of a hash table in a system of the present disclosure.

According to the present disclosure, the variation of the rule set prefix combination distribution caused by the rule update is monitored by the monitoring module, and the hash table merging scheme is updated in time. The monitoring module first measures a Hamming distance between the current rule prefix combination distribution $D_C$ and the corresponding prefix combination distribution $D_P$ during the previous hash table construction. If the Hamming distance is greater than the threshold K, it indicates that the distribution $D_C$ and the distribution $D_P$ do not belong to the same distribution pattern. Therefore, the distribution $D_C$ is sent to the CNN model to find a corresponding label, i.e., a new hash table merging scheme. In addition to the new label, the CNN model may also output a rule set prefix combination distribution R corresponding to this label. If the Hamming distance between $D_C$ and R is still greater than the threshold, the $D_C$ is considered as a new distribution pattern and is transferred to the offline system. Furthermore, by comparing performance of the current merging scheme and performance of Tuple Space Search (TSS) by means of a performance model, a scheme with better performance is selected as the merging scheme. Otherwise, it has become another known distribution, and it is only required to reconstruct the hash table according to the label. The above processes are as shown in FIG. 11.

With this method, when variation of the prefix combination distribution is caused by update of the rule set, the original hash table merging scheme is no longer applicable to a new rule set, so this module can quickly classify a new rule distribution and find a currently optimal hash table merging scheme to reconstruct the hash table, so that performance of the system is always maintained at a higher level.

The descriptions of the various embodiments of the present disclosure have been presented above for purposes of illustration, but are not intended to be exhaustive or limited to the embodiments disclosed. Therefore, it is apparent to an ordinary skilled person in the art that modifications and variations could be made without departing from the scope and spirit of the embodiments. The terminology used herein is chosen to best illustrate the principles of the embodiments, the practical application or technical improvement over technologies found in the marketplace, or to enable others of ordinary skill in the art to understand the embodiments disclosed herein.

What is claimed is:

1. A data packet classification method based on a convolutional neural network, the method comprising:

for each rule set in a training rule set, merging rules in each rule set according to combination of different prefix ranges of source addresses and destination addresses of the rules in the rule set to form a plurality of merging schemes, and determining an optimal merging scheme for each rule set in the training rule set on a basis of performance evaluation;

converting a prefix combination distribution of each rule set in the training rule set and a target rule set into an image, characterizing a parameter of the corresponding prefix combination distribution using a parameter of the image, and training a convolutional neural network model by means of taking the image in the training rule set and the corresponding optimal merging scheme as features; and inputting a target image converted from the target rule set into the convolutional neural network model, determining the merging scheme of the target rule set based on degree of matching between the target image and an image in the convolutional neural network model, and constructing a corresponding hash table for data packet classification.

2. The data packet classification method based on a convolutional neural network according to claim 1, wherein a pixel coordinate of the converted image represents a prefix length or length range combination of the source addresses and the destination addresses of the rules in the corresponding rule set, and a pixel value represents the number of the rules in the corresponding rule set corresponding to the prefix length or length range combination.

3. The data packet classification method based on a convolutional neural network according to claim 1, wherein, the training a convolutional neural network model comprises: classifying the prefix combination distribution of the rule set based on similarity between the images, and determining a corresponding merging scheme for the prefix combination distribution of each category.

4. The data packet classification method based on a convolutional neural network according to claim 3, comprising: calculating differential information between pixels of the image corresponding to each prefix combination distribution as a fingerprint of the corresponding image, calculating a differential value between the fingerprint of each image and a fingerprint of a reference image, and determining a category of the rule set corresponding to the corresponding image based on comparison between the differential value and a predetermined threshold.

5. The data packet classification method based on a convolutional neural network according to claim 1, further comprising: performing rule update on the target rule set, wherein the rule update comprises: determining a corresponding hash table based on a prefix combination length of a to-be-updated rule, updating the to-be-updated rule in a corresponding hash bucket, and updating a value of the pixel corresponding to the to-be-updated rule in the image of the prefix combination distribution corresponding to the target rule set.

6. The data packet classification method based on a convolutional neural network according to claim 1, further comprising: monitoring a Hamming distance before and after the prefix combination distribution of the target rule set is updated, and determining whether to reconstruct the hash table based on the Hamming distance.

7. The data packet classification method based on a convolutional neural network according to claim 1, further comprising: setting a priority for each hash table, wherein the priority represents a highest priority of a rule in the hash table; and sorting all the hash tables, and when performing data packet matching, stopping searching when a priority of a hit rule is not less than a priority of a next hash table.

8. The data packet classification method based on a convolutional neural network according to claim 1, wherein the performance evaluation is carried out by using a formula $$T = \bar{h}\Sigma_{i=1}^m + \bar{c}\Sigma_{i=1}^m \frac{n_i}{s_i} + \bar{q},$$

where $\bar{h}$ represents an average hash time, $\bar{c}$ represents an average verification time, m represents the number of hash tables, $n_i$ represents the number of rules in an ith hash table, $s_i$ represents a size of the $i^{th}$ hash table, and $\bar{q}$ represents a priority comparison time.

9. A computer device comprising a memory and a processor, wherein the memory has stored therein a computer program executable by the processor, which when executed by the processor, causes the processor to perform a method according to claim 1.

10. A data packet classification system based on a convolutional neural network, the system comprising an offline system and an online system; wherein
the offline system comprises a calculation module and a convolutional neural network offline training module, and the online system comprises a data packet classification and forwarding module and a convolutional neural network online module;
the calculation module is configured to merge rules in each rule set of a training rule set according to combination of different prefix ranges of source addresses and destination addresses of the rules, determine an optimal merging scheme for each rule set on a basis of performance evaluation of different merging schemes, and convert each prefix combination distribution of each rule set in the training rule set into an image, to characterize a parameter of the corresponding prefix combination distribution using a parameter of the image;
the convolutional neural network offline training module is configured to train a convolutional neural network model using the training rule set by means of taking the image in the training rule set and the corresponding optimal merging scheme as features;
the convolutional neural network online module is configured to convert the prefix combination distribution of a target rule set into an image, characterize a parameter of the corresponding prefix combination distribution using the parameter of the image, and determine the merging scheme of the target rule set using the trained convolutional neural network model; and
the data packet classification and forwarding module is configured to construct a corresponding hash table based on the merging scheme, to perform data packet classification based on the hash table.

11. The data packet classification system based on a convolutional neural network according to claim 10, wherein the convolutional neural network offline training module is configured to classify the prefix combination distribution of the rule set based on similarity between the images, and determine a corresponding merging scheme for the prefix combination distribution of each category.

12. The data packet classification system based on a convolutional neural network according to claim 11, further comprising a monitoring module, wherein the monitoring module is configured to read the prefix combination distribution of the target rule set and determine a category of the target rule set, and determine, based on variation of the category, whether to reconstruct the hash table.

13. The data packet classification system based on a convolutional neural network according to claim 10, wherein when the rule is updated, the data packet classification and forwarding module determines a corresponding hash table based on the prefix combination of the to-be-updated rule, and update the to-be-updated rule in the corresponding hash bucket, and the convolutional neural network online module updates a value of the pixel corresponding to the to-be-updated rule in the image of the prefix combination distribution corresponding to the target rule set.

14. A computer-readable non-transitory storage medium, storing a computer program therein, wherein the program, when executed by a processor, causes the processor to operations, the operations comprising:
for each rule set in a training rule set, merging rules in each rule set according to combination of different prefix ranges of source addresses and destination addresses of the rules in the rule set to form a plurality of merging schemes, and determining an optimal merging scheme for each rule set in the training rule set on a basis of performance evaluation;
converting a prefix combination distribution of each rule set in the training rule set and a target rule set into an image, characterizing a parameter of the corresponding prefix combination distribution using a parameter of the image, and training a convolutional neural network model by means of taking the image in the training rule set and the corresponding optimal merging scheme as features; and
inputting a target image converted from the target rule set into the convolutional neural network model, determining the merging scheme of the target rule set based on degree of matching between the target image and an image in the convolutional neural network model, and constructing a corresponding hash table for data packet classification.

* * * * *